United States Patent
Harris et al.

(10) Patent No.: US 9,727,149 B2
(45) Date of Patent: Aug. 8, 2017

(54) STYLUS SETTINGS

(71) Applicant: Microsoft Technology Licensing, LLC, Redmond, WA (US)

(72) Inventors: Jonathan R. Harris, Redmond, WA (US); Andrew S. Allen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 14/103,364

(22) Filed: Dec. 11, 2013

(65) Prior Publication Data

US 2014/0101584 A1 Apr. 10, 2014

Related U.S. Application Data

(63) Continuation of application No. 12/820,910, filed on Jun. 22, 2010, now Pat. No. 8,638,303.

(51) Int. Cl.
*G06F 3/048* (2013.01)
*G06F 3/0354* (2013.01)
*G06F 3/038* (2013.01)
*G06F 3/041* (2006.01)
*G02F 1/1333* (2006.01)
(Continued)

(52) U.S. Cl.
CPC ...... *G06F 3/03545* (2013.01); *G02F 1/13338* (2013.01); *G06F 1/1616* (2013.01); *G06F 1/1643* (2013.01); *G06F 1/1647* (2013.01); *G06F 3/016* (2013.01); *G06F 3/038* (2013.01); *G06F 3/0346* (2013.01); *G06F 3/0354* (2013.01); *G06F 3/0383* (2013.01); *G06F 3/041* (2013.01); *G06F 3/0412* (2013.01); *G06F 3/0414* (2013.01); *G06F 3/0416* (2013.01); *G06F 3/0482* (2013.01); *G06F 3/0488* (2013.01); *G06F 3/04883* (2013.01); *G06F 2203/04101* (2013.01);
(Continued)

(58) Field of Classification Search
CPC .... G06F 3/03545; G06F 3/0346; G06F 3/016; G06F 3/041; G06F 3/04883; G06F 3/038; G06F 3/0414; G06F 3/0354; G06F 3/0412; G06F 3/0416; G06F 3/0383; G06F 3/0482; G06F 1/1616; G06F 1/1647; G06F 3/0488; G06F 1/1643; G06F 2203/04106; G06F 2203/04101; G06F 2203/04105; G02F 1/13338; G06K 9/00402

See application file for complete search history.

(56) References Cited

U.S. PATENT DOCUMENTS 5,589,849 A * 12/1996 Ditzik ............... A47B 21/0073
248/921
6,094,197 A 7/2000 Buxton et al.
(Continued)

OTHER PUBLICATIONS

"Foreign Notice of Allowance", CN Application No. 201110185083.2, Feb. 27, 2014, 6 pages.
(Continued)

*Primary Examiner* — William Bashore
*Assistant Examiner* — James F Sugent

(57) ABSTRACT

Stylus settings techniques are described. In implementations, an input is recognized as selecting at least one object displayed in a user interface by a display device of a computing device. Responsive to the recognition, an indication is displayed on the display device that is selectable.

20 Claims, 5 Drawing Sheets

(51) Int. Cl.
*G06F 3/0488* (2013.01)
*G06F 3/01* (2006.01)
*G06F 3/0346* (2013.01)
*G06F 1/16* (2006.01)
*G06F 3/0482* (2013.01)
*G06K 9/00* (2006.01)

(52) U.S. Cl.
CPC .............. *G06F 2203/04105* (2013.01); *G06F 2203/04106* (2013.01); *G06K 9/00402* (2013.01)

(56) References Cited

U.S. PATENT DOCUMENTS

| | | | |
|---|---|---|---|
| 6,539,101 | B1 | 3/2003 | Black |
| 8,638,303 | B2 | 1/2014 | Harris |
| 2002/0122029 | A1* | 9/2002 | Murphy ................... G06F 3/041 345/173 |
| 2002/0163511 | A1 | 11/2002 | Sekendur |
| 2005/0110778 | A1* | 5/2005 | Ben Ayed ........... G06F 3/03545 345/179 |
| 2008/0222542 | A1* | 9/2008 | Woolf ................... G06F 17/241 715/764 |
| 2010/0095205 | A1* | 4/2010 | Kinoshita ............. G06F 3/0416 715/702 |
| 2011/0074703 | A1 | 3/2011 | Black |
| 2011/0289444 | A1 | 11/2011 | Winsky |
| 2011/0310031 | A1 | 12/2011 | Harris et al. |

OTHER PUBLICATIONS

"Final Office Action", U.S. Appl. No. 12/820,910, (Jan. 17, 2013), 14 pages.

"Foreign Office Action", Chinese Application No. 201110185083.2, (Aug. 8, 2013), 9 Pages.

"Foreign Office Action", Chinese Application No. 201110185083.2, (Dec. 5, 2012), 13 pages.

"Non-Final Office Action", U.S. Appl. No. 12/820,910, (Apr. 3, 2013), 14 pages.

"Non-Final Office Action", U.S. Appl. No. 12/820,910, (Aug. 28, 2012), 12 pages.

"Notice of Allowance", U.S. Appl. No. 12/820,910, (Sep. 11, 2013), 5 pages.

\* cited by examiner

STYLUS SETTINGS

RELATED APPLICATIONS

The application claims priority under 35 U.S.C. Section 120 as a continuation of U.S. patent application Ser. No. 12/820,910, filed Jun. 22, 2010, and titled "Stylus Settings,", the entire disclosure of which is incorporated by reference.

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Additionally, inclusion of these features using traditional techniques may force the user to navigate through menus to access the features "away" from the current user interface. Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions and the device as a whole to a user of the computing device.

SUMMARY

Stylus settings techniques are described. In implementations, an input is recognized as indicating that a body of a stylus is disposed against a display device of a computing device. Responsive to the recognizing, a portion is displayed in a user interface on the display device that is selectable to specify one or more input characteristics of the stylus to be used for subsequent inputs received by the computing device in conjunction with the stylus.

In implementations, a body of a stylus is detected as being disposed against a surface of a computing device. The stylus is configured to include two ends separated by the body and the detecting is performed to determine that the body of the stylus is disposed against the surface of the computing device and not either of the ends of the stylus. Responsive to the detection, one or more actions that are to be performed responsive to the detecting are determined and the determined one or more actions are performed.

In implementations, a computing device comprises a housing, one or more display devices disposed within the housing, and one or more modules disposed within the housing. The one or more modules are configured to perform operations comprising detecting an input using touchscreen functionality of the one or more display devices; recognizing from the input that a body of a stylus is disposed against a surface of the one or more display devices, the stylus configured to include two ends separated by the body; and responsive to the recognizing, displaying a portion in a user interface on the display device that is selectable to specify one or more input characteristics of the stylus to be used for subsequent inputs received by the computing device in conjunction with the stylus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional functionality of a computing device is often accessed using a menu, which may contain a variety of hierarchical levels as well as a variety of choices at each of the levels. Accordingly, access to these functions may interrupt a current user experience.

Stylus settings techniques are described. In implementations, a computing device is configured to recognize placement of a body of a stylus against a display device of the computing device, such as detecting the "laying" of the stylus on the display device using touchscreen functionality. The computing device may then invoke user interface states and/or perform actions in response. For example, the computing device may output a portion in a user interface that is configured to select settings to be used in conjunction with the stylus.

The settings, for instances, may describe input characteristics to be applied to subsequent inputs from the stylus, such as to draw a line to mimic a pencil, provide an erase operation, and so on. Thus, in this example, the settings of the stylus may be accessed without navigating through menus, thereby providing an intuitive technique to access the settings. Although input characteristics have been described in this example, a variety of other actions may be performed, further discussion of which may be found in relation to the following sections.

In the following discussion, an example environment is first described that is operable to employ the stylus settings techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
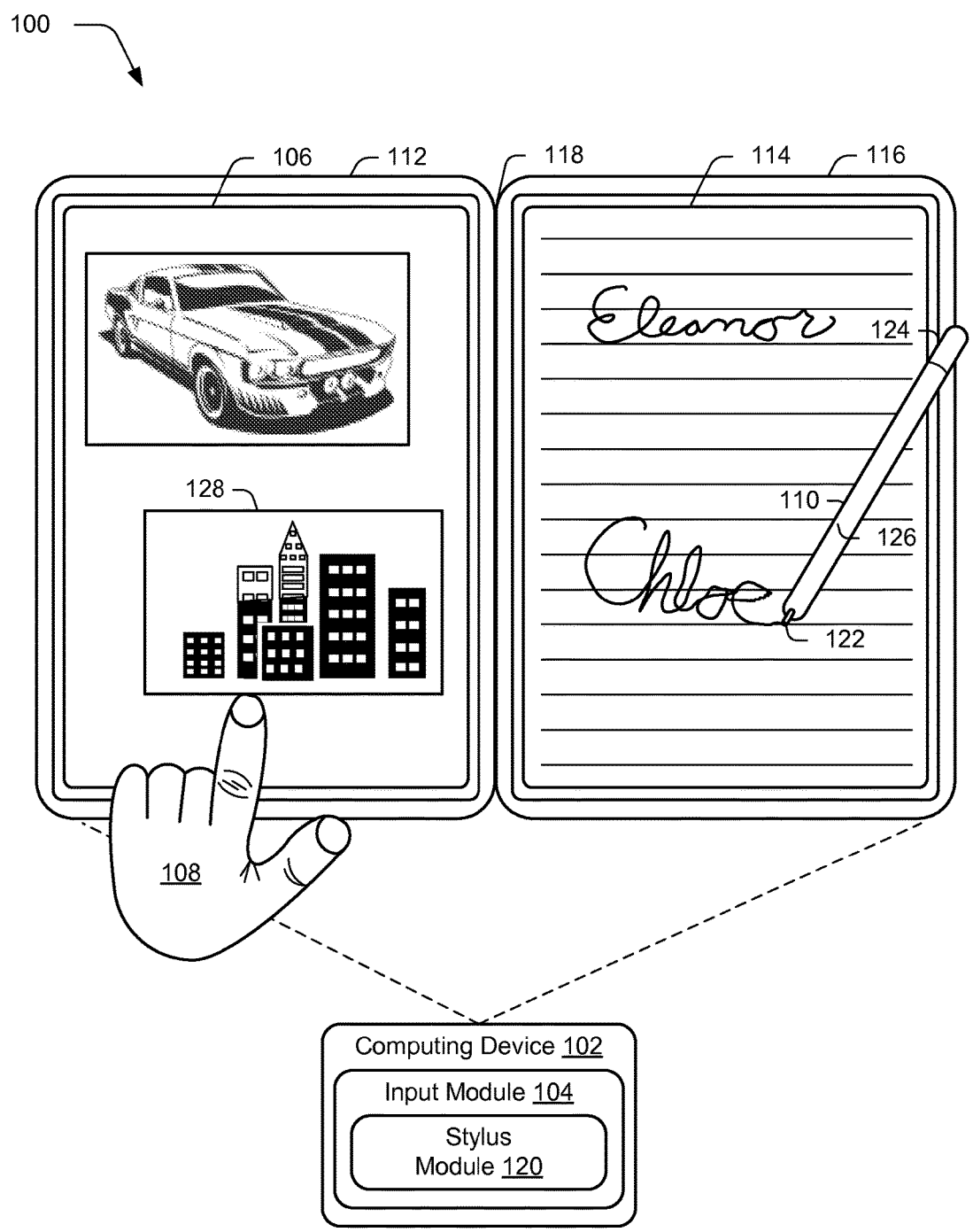
FIG. 1 is an illustration of an environment in an example implementation that is operable to employ stylus settings techniques described herein.

FIG. 1 is an illustration of an environment 100 in an example implementation that is operable to employ stylus settings techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 108 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 5.

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 108. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

Additionally, although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices.

The computing device 102 in this example is further illustrated as assuming a dual screen configuration. In the illustrated example, the computing device 102 includes the first display device 106, which is disposed in a first housing 112. The computing device 102 also has a second display device 114 disposed in a second housing 116. A binding system 118 is also included (a rotatable mechanism such as a hinge, pivot, and so on), which movably connects the first housing 112 to the second housing 114. In an embodiment, the binding system 118 can be implemented as a multi-axis hinge that movably connects the first housing 112 to rotate in at least two different directions relative to the second housing 114. Alternatively or in addition, the binding system 118 can include an internal drive mechanism to position the first housing 112 and/or the second housing 114 in one or more various display postures, the example of which is a "flat" posture such that the first and second housings 112, 114 may be positioned when laid on a surface. Alternatively or in addition, the binding system 118 may also include passive mechanical positioned detents to retain the two halves in various relative postures as further described below.

The computing device 102 is further illustrated as including a stylus module 120. The stylus module 120 is representative of functionality of the computing device relating to the stylus 110. For example, the stylus module 120 may be configured to perform one or more actions responsive to the stylus 110, such as to draw lines as illustrated by the handwritten freeform lines in the second display device 114 that illustrate "Eleanor" and "Chloe."

The stylus module 120 may also be configured to associate different types of inputs depending on which part of the stylus 110 is used to interact with the computing device 102. For example, the stylus 110 may include a first end 122 and a second end 124 that are positioned on opposing sides of the stylus 110 and are separated by a body 126 of the stylus. The first end 122 may be configured, through the stylus module 120, to perform writing operations, such as to draw a line to mimic a pencil, pen, brush, and so on. The second end 124 may be configured, through the stylus module 120, to perform erase operations, such as to mimic a rubber eraser, erase portions of a user interface disposed beneath the second end 124 in a user interface output by the computing device 102 (e.g., portions of the image 128 displayed on the first display device 106), and so on. Thus, the stylus module 120 may provide interaction via the stylus 110 that is intuitive and natural to a user.

The stylus module 120 may also be configured to perform actions responsive to identification of a body 126 of the stylus that is disposed between the first and second ends 122, 124 of the stylus 110. For example, the body 126 of the stylus 110 may be placed against a surface of the second display device 114. The stylus module 120 may detect this placement (e.g., through touchscreen functionality, positional sensors of the stylus 110, and so on) and perform actions in response. A variety of different actions may be performed, examples of which may be found in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the stylus settings techniques described below are platform-independent, meaning that the techniques may be implemented on a variety of commercial computing platforms having a variety of processors.

Stylus Settings Implementation Example

Figure 2:
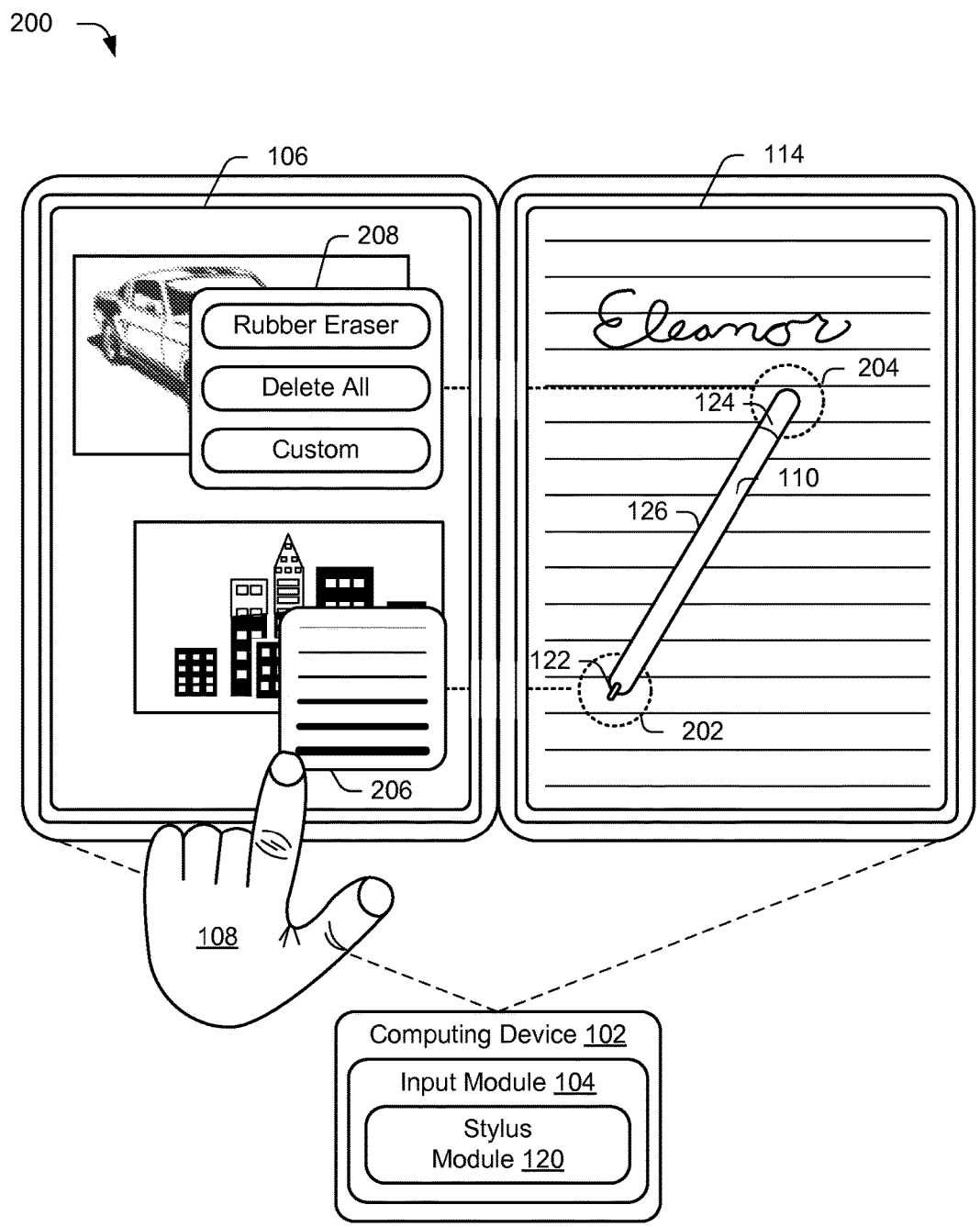
FIG. 2 depicts a system in an example implementation showing a computing device of FIG. 1 as outputting a user interface to specify settings of a stylus responsive to detection of a body of the stylus as being placed against a display device.

FIG. 2 depicts a system 200 in an example implementation showing the computing device 102 of FIG. 1 as outputting a user interface to specify settings of the stylus 110 responsive to detection of the body of the stylus 110 as being placed against the second display device 114. A top view of the computing device 102 is illustrated in this example, such as a position assumed by the computing device 102 when placed on a surface, e.g., a desk.

The stylus 110 is illustrated as disposed against a surface of the second display device 114, such by placing the stylus 110 "down" against the second display device when the computing device 102 is positioned horizontally as described above. The stylus module 120 may then detect the position of the stylus 110 (e.g., using sensors of the computing device 102 and/or the stylus 110) and perform one or more actions.

One of these actions is illustrated in this figure as an indication that the positioning of the stylus 110 against the second display device 114 has been recognized by the stylus module 120. This is illustrated as a display of dashed first and second dashed circles 202, 204 at the first and second ends 122, 124 of the stylus 110 by the second display device 114.

Another one of these actions involves display of portions 206, 208 in a user interface output by the first display device 106 that are selectable to specify characteristics to be used for inputs of the stylus 110. For example, the first portion 206 as displayed on the first display device 106 includes selections of various widths of lines that may be input in conjunction with the first end 122 of the stylus 110. Thus, in this example, the user may place the stylus 110 against the first display device 114 and select a width to be used (e.g., using a finger of the user's hand 108) for inputs from the first end 122.

Likewise, the second portion 208 may be configured to specify inputs to be associated with the second end 124 of the stylus 110, which in this example are erase operations. The second portion 208, for instance, includes buttons labeled "rubber eraser," "delete all," and "custom." Selection of the "rubber eraser" representation may cause characteristics of a rubber eraser to be applied to inputs received via the second end 124 of the stylus 110, such as to lighten lines, erase portions of a line, and so on.

Selection of the "delete all" representation may cause lines to be deleted in their entirety. For example, the user may "tap" the second end 124 of the stylus 110 to erase an entire line that was written using the first end 122 of the stylus 110. Custom characteristics may also be specified, such to specify different operations to be associated with a "tap" of the second end 124 as opposed to movement across the display device 114, e.g., a "rub." A variety of other examples are also contemplated, another example of which is discussed in relation to the following figure.

Figure 3:
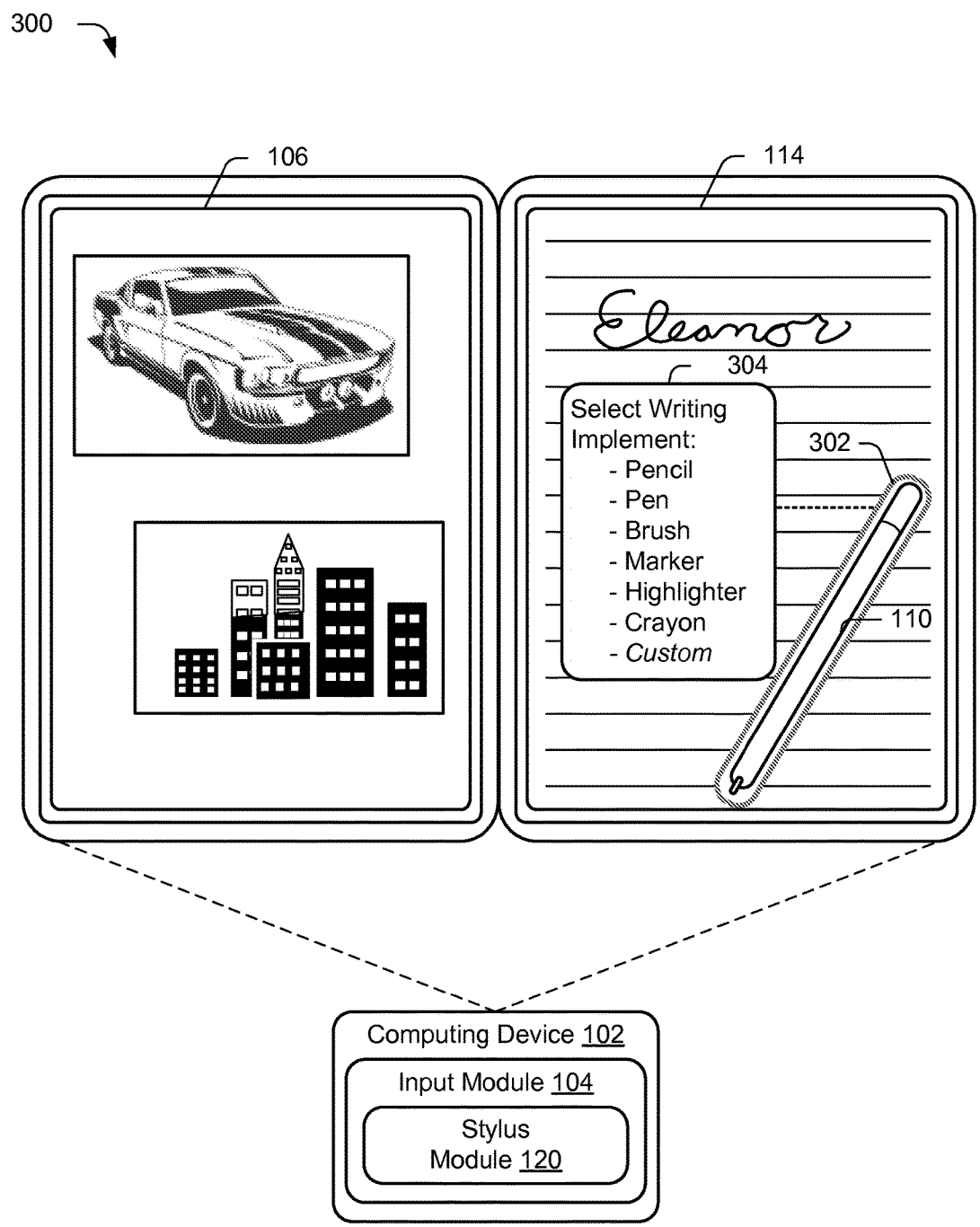
FIG. 3 is an illustration of a system in an example implementation in which a representation of a writing implement is selectable responsive to recognition that a body of a stylus of FIG. 1 has been disposed against a display device of a computing device.

FIG. 3 is an illustration of a system 300 in an example implementation in which a representation of a writing implement is selected responsive to recognition that a body of the stylus 110 has been disposed against the second display device 114. Like before, this stylus module 120 is illustrated as causing an indication to be displayed that the positioning of the stylus 110 against the second display device 114 has been recognized. In this example, the indication 302 is configured as a shadow that substantially surrounds the stylus 110 as positioned against the second display device 114. Thus, it should be readily apparent that the indication may take a variety of forms without departing from the spirit and scope thereof.

A portion 304 is output in this example on the second display device 114. The portion 304 further includes representations of writing implements that are to be mimicked for subsequent inputs of the stylus 110. For example, a user may select a representation of a "pencil" to have inputs of the stylus 110 mimic a traditional pencil, such as to draw and/or erase lines in a user interface. Other examples are illustrated as a "pen," "brush," "marker," "highlighter," "crayon," and "custom." Thus, in this example a user may choose a representation and have corresponding characteristics mimicked by the stylus 110. Although techniques have been described in which settings of the stylus 110 were specified, a variety of other actions (e.g., UI states) are also contemplated, further discussion of which may be found in relation to the following procedures.

Example Procedures

The following discussion describes stylus settings techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-400 of FIGS. 2-4.

Figure 4:
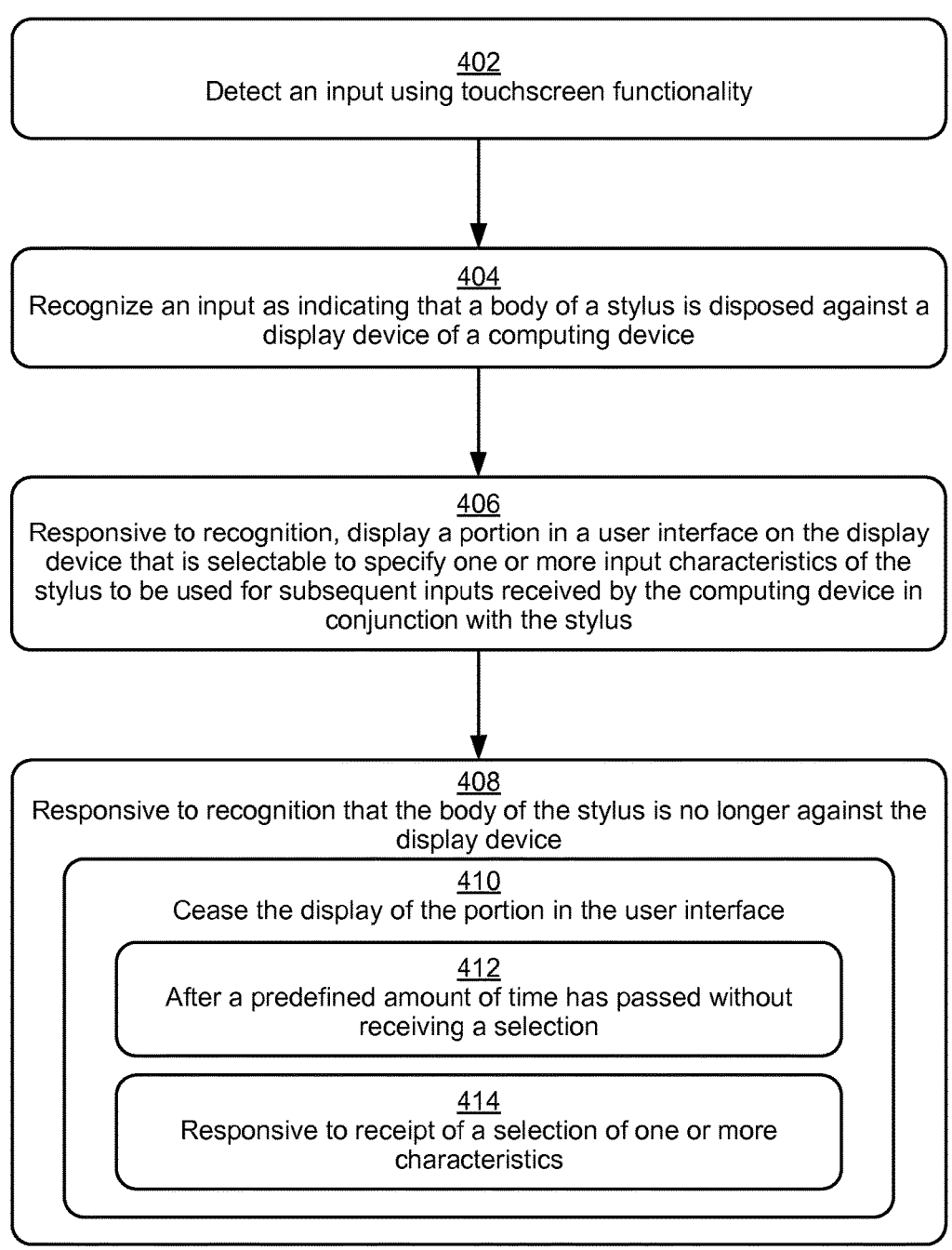
FIG. 4 is a flow diagram depicting a procedure in an example implementation in which an input is recognized as a body of a stylus disposed against a display device, recognition of which is used to initiate one or more actions.

FIG. 4 depicts a procedure 400 in an example implementation in which an input is recognized as a body of a stylus disposed against a display device, recognition of which is used to initiate one or more actions. An input is detected using touchscreen functionality (block 402). For example, the input may be detected using similar functionality to that used to detect the finger of the user's hand 108, through use of a camera, and so on. Other detection scenarios are also contemplated, such as detection through one or more sensors of the stylus 110 and subsequent communication to the computing device 102.

The input is recognized as indicating that a body of a stylus is disposed against a display device of a computing device (block 404). The stylus module 120, for instance, may process the input and determine that the stylus 110 has been placed "down" against the computing device 102 when resting against a surface, held up against the computing device 102 when at a vertical angle, and so on.

Responsive to the recognition, a portion is displayed in a user interface on the displace device that is selectable to specify one or more input characteristics of the stylus to be used for subsequent inputs received by the computing device in conjunction with the stylus (block 406). As shown in FIG. 2, for instance, portions 206, 208 may be output to specify writing characteristics, erasing characteristics, and so on. In FIG. 3, instances of selections of representations of writing implements to be mimicked by the stylus 110 were discussed. Other instances are also contemplated, such as to initiate actions that are not related to specifying settings of the stylus, such as to output a menu related to settings of the display device, initiate performance of an action similar to other gestures (e.g., stamp, cut, move), and so on.

Responsive to recognition that the body of the stylus is no longer against the display device (block 408), the display of the portion in the user interface is ceased (block 410). For example, the display may cease after a predefined amount of time has passed without received a selection (block 412), e.g., the display of the portion "times out." In another example, the display ceases responsive to receipt of a selection of one or more characteristics (block 414), such as to select a representation of a writing implement for which characteristics are to be mimicked as described in relation to FIG. 3, responsive to selection of particular characteristics themselves (e.g., width of a line) as described in relation to FIG. 2, and so on. Thus, the placement of the stylus 110 may be leveraged to provide a variety of different functionality by initiating actions responsive to the placement as described above.

Example Device

Figure 5:
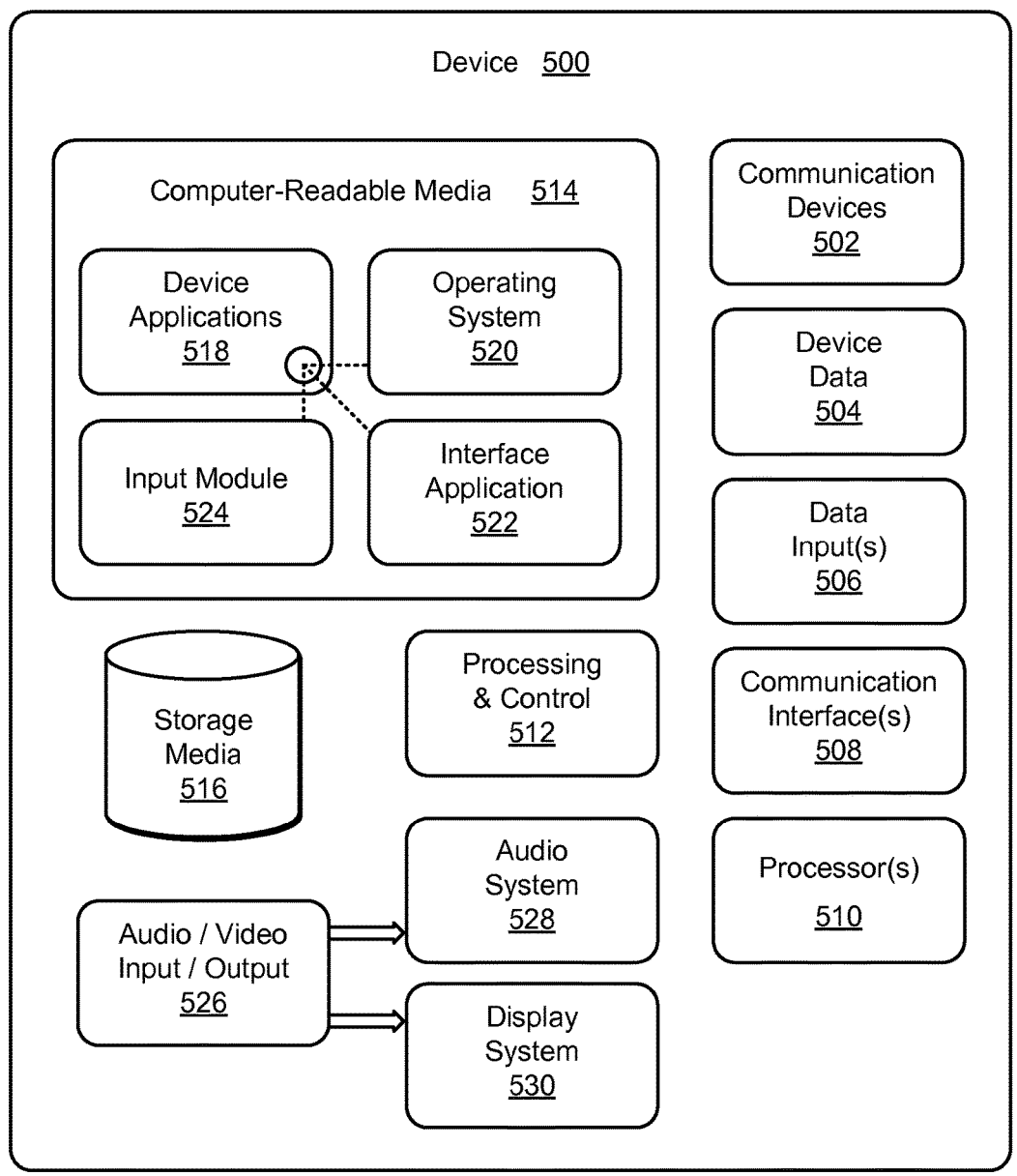
FIG. 5 illustrates various components of an example device that can be implemented as any type of portable and/or computer device as described with reference to FIGS. 1-3 to implement embodiments of the stylus settings techniques described herein.

FIG. 5 illustrates various components of an example device 500 that can be implemented as any type of portable and/or computer device as described with reference to FIGS. 1 and 2 to implement embodiments of the gesture techniques described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of a touch pull-in gesture. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the gesture techniques described herein. In this example, the device applications 518 include an interface application 522 and an input module 524 (which may be the same or different as input module 114) that are shown as software modules and/or computer applications. The input module 524 is representative of software that is used to provide an interface with a device configured to capture inputs, such as a touchscreen, track pad, camera, and so on. Alternatively or in addition, the interface application 522 and the input module 524 can be implemented as hardware, software, firmware, or any combination thereof. Additionally, the input module 524 may be configured to support multiple input devices, such as separate devices to capture touch and stylus inputs, respectively. For example, the device may be configured to include dual display devices, in which one of the display device is configured to capture touch inputs while the other stylus inputs.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing a first input as indicating a body of a stylus is placed flat against a touchscreen of a display device of a computing device, the recognizing distinguishing the body of the stylus from at least one end of the stylus;
   responsive to the recognizing the first input as indicating the body of the stylus, displaying a portion in a user interface on the display device that is selectable to specify an action performed by the computing device; and
   receiving a second input as indicating initiating the action performed by the computing device.

2. The method of claim 1, wherein the displayed portion in the user interface is a menu related to settings for the computing device.

3. The method of claim 1, wherein the displayed portion in the user interface is a menu of settings for the display device.

4. The method of claim 1, wherein the action performed by the computing device comprises manipulating an object displayed on the display device.

5. The method of claim 1, wherein the second input is a touch input.

6. The method of claim 1, wherein the second input is a stylus input.

7. The method of claim 1, wherein the recognizing the first input includes recognizing that the first input indicates the body of the stylus is placed on the touchscreen of the display device that is horizontally-oriented.

8. The method of claim 1, wherein the recognizing the first input includes recognizing that the first input indicates the body of the stylus is placed flat against the touchscreen of the display device that is vertically-oriented.

9. A computing device comprising:
   a display device;
   a stylus;
   one or more processors coupled to the display device;
   memory, coupled to the one or more processors, comprising instructions executable by the one or more processors to perform operations comprising:
   detecting a first input to the computing device;
   differentiating whether the first input is a touch input or a stylus input;
   responsive to differentiating that the first input is the stylus input, determining that a body of the stylus, the stylus having ends and the body being other than the ends of the stylus, is displaced flat against a touchscreen of the display device, the determining distinguishing the body of the stylus from at least one of the ends of the stylus;
   responsive to determining that the body of the stylus is displaced flat against the touchscreen of the display device, displaying a portion in a user interface on the display device that is selectable to specify settings for the computing device; and
   receiving a second input as indicating initiating an action relating to the settings for the computing device.

10. The computing device of claim 9, wherein said differentiating is performed by detecting an amount of the touchscreen of the display device that is contacted by a finger of a user's hand as compared to the amount of the touchscreen of the display device that is contacted by the stylus.

11. The computing device of claim 9, further comprising performing the action relating to the settings for the computing device.

12. The computing device of claim 9, wherein said differentiating between the touch input and the stylus input is performed using a camera.

13. The computing device of claim 9, wherein the stylus further comprises one or more sensors in the stylus communicatively coupled to the one or more processors.

14. The computing device of claim 13, wherein said detecting the first input to the computing device is performed at least in part using the one or more sensors in the stylus.

15. The computing device of claim 13, wherein said determining that the body of the stylus is displaced flat against the touchscreen of the display device is performed at least in part using the one or more sensors in the stylus.

16. One or more computer-readable storage memories comprising stored instructions executable by one or more processors to perform:
   recognizing a first input as indicating a body of a stylus, the stylus having ends and the body being other than the ends of the stylus, is placed flat against a touchscreen of a display device of a computing device, the recognizing distinguishing the body of the stylus from at least one end of the stylus;
   responsive to the recognizing the first input as indicating the body of the stylus, displaying a portion in a user interface on the display device that is selectable to specify an action performed by the computing device; and
   receiving a second input as indicating initiating the action performed by the computing device.

17. The computer-readable storage memories of claim 16, wherein the displayed portion in the user interface is a menu related to settings for the computing device.

18. The computer-readable storage memories of claim 16, wherein the instructions are further executable by the one or more processors to perform ceasing display of the portion in the user interface responsive to recognizing that the body of the stylus is no longer placed against the touchscreen of the display device.

19. The computer-readable storage memories of claim 16, wherein the action performed by the computing device comprises manipulating an object displayed on the display device.

20. The computer-readable storage memories of claim 16, wherein the second input is one of a touch input or a stylus input.

* * * * *